(12) United States Patent
Moon et al.

(10) Patent No.: US 6,391,256 B1
(45) Date of Patent: May 21, 2002

(54) DISSOLVED OXYGEN REMOVAL METHOD USING ACTIVATED CARBON FIBER AND APPARATUS THEREOF

(75) Inventors: Jeon Soo Moon; Kwang Kyu Park, both of Daejeon; Gon Seo, Kwangju; Hae Ran Song, Daejeon, all of (KR)

(73) Assignee: Korea Electric Power Corporation, Seoul (KR)

( * ) Notice: Subject to any disclaimer, the term of this patent is extended or adjusted under 35 U.S.C. 154(b) by 0 days.

(21) Appl. No.: 09/172,603

(22) Filed: Oct. 15, 1998

(30) Foreign Application Priority Data

Oct. 15, 1997 (KR) ............................ 97-52910

(51) Int. Cl.$^7$ .......................... C23F 11/08; C02F 1/20
(52) U.S. Cl. ........................... 422/14; 422/11; 422/17; 210/750; 210/757; 252/178
(58) Field of Search ............................ 422/11, 14, 17; 423/579, DIG. 8; 210/660, 750, 757, 767, 202; 122/379, 397; 252/178

(56) References Cited

U.S. PATENT DOCUMENTS

| | | | |
|---|---|---|---|
| 3,052,527 A | * | 9/1962 | Andrus |
| 4,574,071 A | * | 3/1986 | De Silva et al. ............... 422/14 |
| 4,681,737 A | * | 7/1987 | Walker et al. ............. 422/11 X |
| 4,789,488 A | * | 12/1988 | De Silva .................. 422/14 X |
| 4,851,130 A | * | 7/1989 | May .......................... 422/17 X |
| 4,895,703 A | * | 1/1990 | Zupanovich et al. ..... 422/11 X |
| 5,190,627 A | * | 3/1993 | Saito et al. ............... 204/158.2 |
| 5,287,392 A | * | 2/1994 | Cowan, II et al. .......... 376/301 |
| 5,446,005 A | * | 8/1995 | Endo .......................... 502/443 |

OTHER PUBLICATIONS

Seo, Gon et al. "Kinetics of reduction of disolved oxygen by hydrazine over Pd/C catalysts, " Hwahak Konghak, 34(5), pp. 671–673, 1996.*

* cited by examiner

*Primary Examiner*—Elizabeth McKane
(74) *Attorney, Agent, or Firm*—Dykema Gossett PLLC

(57) ABSTRACT

A dissolved oxygen removal method using an activated carbon fiber catalyst thereof which includes the steps of a reducing agent injection step for injecting a reducing agent into the water, a reactor entrance dissolved oxygen measuring step for measuring a concentration of a dissolved oxygen contained in a water, a water flow rate control step for controlling the supplied amount of the water, an activated carbon fiber catalyst reaction step for removing a dissolved oxygen contained in the water with the reaction between the reducing agent and the dissolved oxygen in an activated carbon fiber reactor in which an activated carbon fiber catalyst is packed, and a control step for controlling the feeding rate of the reducing agent in accordance with the water flow rate and the reactor entrance dissolved oxygen, for thereby extending the life time of the facility and decreasing the operational and maintenance costs by fully removing a dissolved oxygen in water used for an steam generator or cooling system.

10 Claims, 2 Drawing Sheets

DISSOLVED OXYGEN REMOVAL METHOD USING ACTIVATED CARBON FIBER AND APPARATUS THEREOF

BACKGROUND OF THE INVENTION

1. Field of the Invention

The present invention relates to a dissolved oxygen removal method using an activated carbon fiber and an apparatus thereof for preventing corrosion of metal due to dissolved oxygen contained in water used in a steam generator and a cooling water system, and in particular, to an improved dissolved oxygen removal method using an activated carbon fiber and an apparatus thereof which are capable of significantly enhancing removal performance of dissolved oxygen contained in water when impregnating metals on an activated carbon fiber based on the characteristics that an activated carbon fiber (ACF) has an excellent adsorption force for dissolved oxygen and a high surface area, so that the method and apparatus according to the present invention are effectively applicable for a water treatment system of a steam generator and a cooling water system.

2. Description of the Conventional Art

The following table 1 illustrates dissolved oxygen concentration contained in water at atmospheric pressure. As shown therein, a large amount of dissolved oxygen (8~10 ppm) is contained in water at room temperature when water is exposed to air.

TABLE 11

Concentration of dissolved oxygen in water based on temperature

| T | 10 | 21 | 32 | 43 | 54 | 66 | 77 | 88 | 99 |
|---|----|----|----|----|----|----|----|----|-----|
| D | 11.43 | 8.87 | 7.45 | 6.15 | 5.44 | 4.43 | 3.43 | 21.15 | 1.43 |

In the table, T represents temperature (° C.), and D represents dissolved oxygen (ppm).

When the water in which dissolved oxygen is saturated is directly used for a steam generator, a corrosion may occur in a metal for thereby decreasing the life time of the system and causing operational problems. The corrosion of the metals due to the dissolved oxygen is composed of a cathodic reaction in which a reduction reaction of dissolved oxygen occurs and an anodic reaction in which an oxidation reaction occurs.

Corrosion reaction of Fe due to dissolved oxygen i) Cathodic reaction: $O_2 + 4H^+ + 2H_2O$ (acid solution)

$O_2 + 2H_2O + 4e \rightarrow 4\ OH^+$ (neutral, alkali solution)

ii) Anodic reaction: $Fe \rightarrow F^{+2} + 2e$ $Fe^{+2} + 2\ OH^- \rightarrow Fe(OH)_2$ (or $FeOnHO_2$)

$4\ Fe(OH)_2 + O_2 + 2H_2O \rightarrow 4\ Fe(OH)_3$ (or $Fe_2O_3 nH_2O$)

$2\ Fe(OH)_3 \rightarrow Fe_2O_3 + H_2O$ (high temperature)

The corrosion product of Fe is classified into three products. Among which, $Fe(OH)_2$ is green in color and produced at a neighboring surface of the metal, $Fe(OH)_3$ is grey in color and produced at an outer most portion, and $Fe_3O_4\ H_2O$ are black color in and produced between the above-described two layers.

The metal corrosion in water due to the dissolved oxygen is proportional to the concentration of the dissolved oxygen and linearly increases. In the case that there is no dissolved oxygen, the corrosion rate of Fe is low (below 0.2 mpy), and when the water is saturated by the dissolved oxygen, the corrosion rate is increased by more than 100 times. When corrosion occurs, the process heat efficiency ratio is significantly decreased because the corrosion products are formed on the heat transfer surfaces, thereby decreasing the life time of the system.

Therefore, in order to maintain a corrosion prevention effect and a heat efficiency of a metal based on the dissolved oxygen, the concentration of the dissolved oxygen contained in water should be strictly limited. The following table 2 illustrates an example that the limits of the dissolved oxygen suggested by steam generator manufacturers. As shown therein, it is recommended to maintain the concentration of the dissolved oxygen below 10 ppb in the normal operation mode.

TABLE 2

Limits of Dissolved Oxygen Suggested by Steam Generator Manufacturers (ppb)

| Source | System | Operation | Hot stand-by | Cold shut-down |
|--------|--------|-----------|--------------|----------------|
| Westing house | Boiler | <5 | <100 | <100 |
| Combustion Engineering | Boiler | <10 | <100 | <100 |
| Bobcock & Wilcox | Boiler | <7 | <100 | <100 |
| EPRI | Boiler | <3 | <100 | <100 |
|  | Condenser | <10 |  |  |

In the conventional dissolved oxygen removal method, the dissolved oxygen in water used for the steam generator is removed based on a mechanical degasifier and reducing agent (for example, hydrazine). However, the above-described conventional methods have the following disadvantages in view of the processing performance and cost.

1. Mechanical Deaerating Method i) Vacuum Deaerating Method

This method has been most widely used for removing the dissolved oxygen of make-up water in a steam generator of a nuclear power plant. The operational principle is to spray water into a vacuum tower and to decrease the pressure of the tower gas phase for thereby removing a non-condensable gas. The packed towers are preferably designed in more than two stages for thereby increasing the oxygen removing efficiency.

The dissolved oxygen removing efficiency is affected by the vacuum degree, the size of the packed tower, the water temperature at an entrance, etc. The packing material preferably has a large surface area per unit volume and then the size of the packed tower is determined. There should not be a by-product of an impurity from the packing material, and the vacuum degree should be maintained at a predetermined degree using a vacuum pump and a vapor ejector for thereby fully removing oxygen, nitrogen and $CO_2$ from the packed tower. The water processed by the vacuum deaerating method contains a dissolved oxygen in a range of 30–40 ppb. Namely, it is impossible to perfectly remove the dissolved oxygen. The dissolved oxygen concentration is increased by air leakage at the sealed portions. In addition, a special sealing apparatus is required for maintaining the system at a predetermined vacuum degree. In addition, in order to maintain a vacuum state in the interior of the packed tower, an expensive apparatus is and needed high maintenance costs are incurred.

ii) Thermal Deaerating Method

The gas solubility in water is proportional to the partial pressure in a gas phase according to the Henry's rule. Therefore, it is possible to remove the dissolved oxygen in water by decreasing the partial pressure in a gas phase. In addition, the gas solubility is decreased as the temperature of water is increased. The thermal deaerating method heats the water using the heating steam and to removes the dissolved gas by decreasing the partial pressure of a gas.

In this thermal deaerating method, the dissolved oxygen may be decreased below 7 ppb under the optimum operation of the thermal deaerator; however, it is impossible to apply the above-described thermal deaerating method to a system in which there is not a heating source such as steam and heater.

2. Reducing Agent (Hydrazine) Processing Method

As one of the effective methods for removing the dissolved oxygen in water, there is a method using a reducing agent such as hydrazine. The oxygen removing chemical reaction of hydrazine in water is as follows. Since nitrogen gas and water molecular are produced as by-product of the reaction and do not effect the corrosion of the metal, the above-described method is widely used for removing the dissolved oxygen.

$$N_2H_4 + O_2 \rightarrow N_2 + 2H_2O$$

In this method, hydrazine 1 ppm per oxygen 1 ppm is consumed as a chemical agent. However, since the reaction is implemented at a relatively high temperature (above 80° C.), it is very difficult to remove the dissolved oxygen at room temperature.

SUMMARY OF THE INVENTION

Accordingly, it is an object of the present invention to provide a dissolved oxygen removal method using an activated carbon fiber and an apparatus thereof which overcomes the aforementioned problems encountered in the conventional art.

It is another object of the present invention to provide a dissolved oxygen removal method using an activated carbon fiber and an apparatus thereof which are capable of extending the life time of the facility and decreasing the operational and maintenance costs by fully removing dissolved oxygen from water used for an steam generator or a cooling system for thereby minimizing corrosion of metal and effectively removing the dissolved oxygen in water by a metal supported activated carbon fiber or an activated carbon fiber.

In order to achieve the above objects, there is provided a dissolved oxygen removal method using an activated carbon fiber which includes the steps of a reducing agent injection step for injecting a reducing agent into the water, a reactor entrance dissolved oxygen measuring step for measuring a concentration of a dissolved oxygen contained in a water, a control or measurement step of water flow rate, an oxygen removal catalytic reaction step of dissolved oxygen and reducing agent in an activated carbon fiber reactor in which an activated carbon fiber catalyst is packed, and a flow control step of reducing agent in accordance with the concentration of the dissolved oxygen and the water flow rate at the entrance of the reactor.

In order to achieve the above objects, there is provided a dissolved oxygen removal apparatus using an activated carbon fiber which includes a water tank for storing water therein, a water pump connected with the water tank for pumping water, a reducing agent injection unit for injecting a reducing agent into water from the water tank, a water flow controller for supplying the water to a activated carbon fiber reactor, a reactor inlet dissolved oxygen measuring unit connected with the water flow controller for measuring dissolved oxygen, an activated carbon fiber catalyst reactor connected with the water pump, in which reactor an activated carbon fiber catalyst is packed, for performing a catalytic reaction between the dissolved oxygen and the reducing agent, a water quality monitoring unit for automatically recording the measured values of the dissolved oxygen measuring unit at the inlet and outlet of the activated carbon fiber catalyst reactor.

In the present invention, it is possible to implement an excellent dissolved oxygen removing effect based on the dissolved oxygen removing apparatus according to the present invention.

Additional advantages, objects and other features of the invention will be set forth in part in the description which is follows and in part will become apparent to those having ordinary skill in the art upon examination of the following or may be learned from practice of the invention. The objects and advantages of the invention may be realized and attained as particularly pointed out in the appended claims as a result of the experiment compared to the conventional arts.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
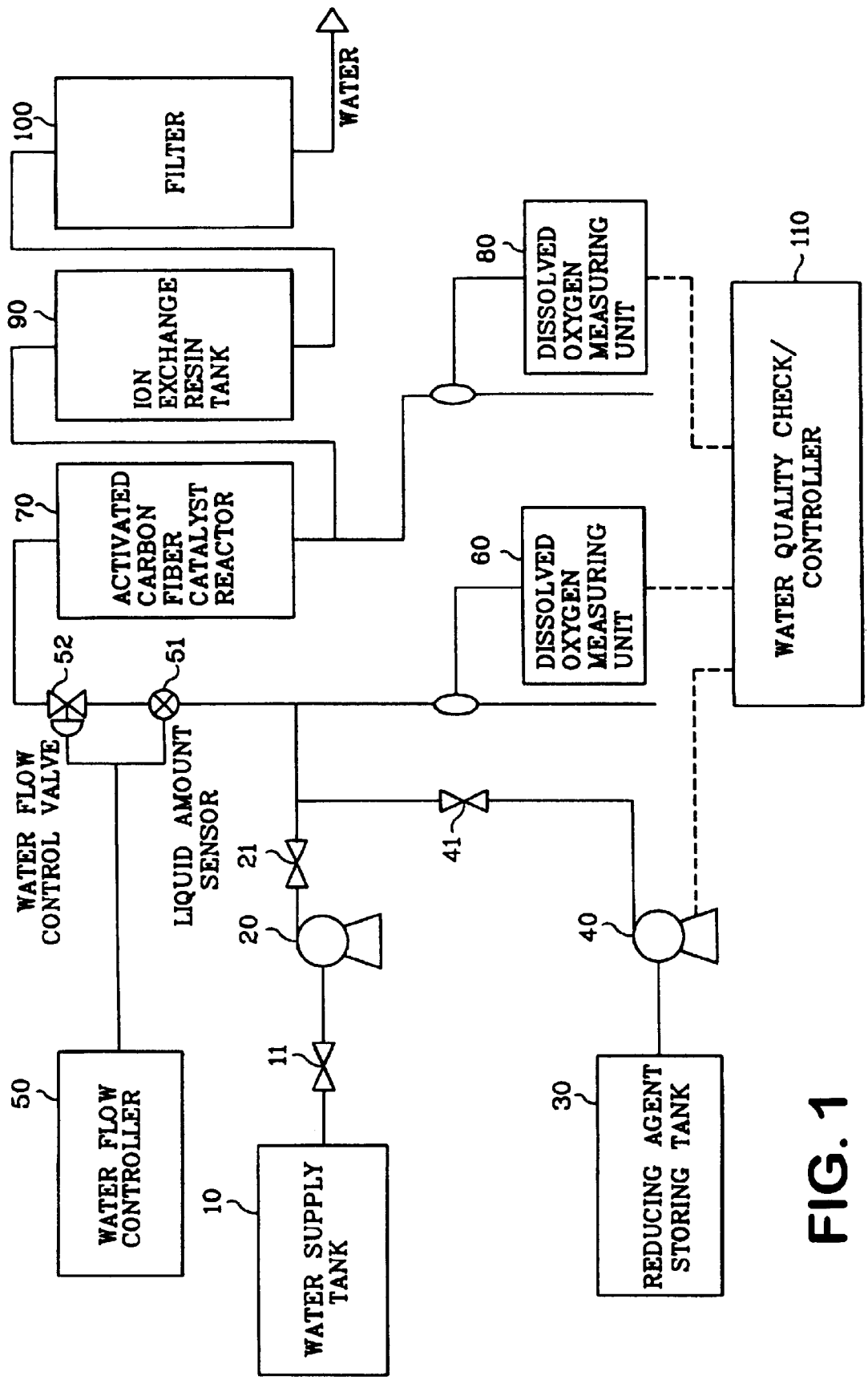
FIG. 1 is view illustrating a dissolved oxygen removal apparatus based on a activated carbon fiber according to the present invention.

As shown in FIG. 1, the dissolved oxygen removing apparatus based on an activated carbon fiber according to the present invention includes a water supply tank 10 for storing water therein, a water pump 20 connected with the water supply tank 10 for pumping water, a reducing agent storing tank 30 and an injection pump 40 for feeding the reducing agent into water from the water supply tank 10, a water flow controller 50 for controlling the amount of water, a dissolved oxygen measuring unit 60 for measuring the dissolved oxygen in the water pumped by the water pump 20, an activated carbon fiber catalyst reactor 70 connected with the water pump 20, in which reactor 70 an activated carbon fiber catalyst is packed, for performing a catalytic reaction between the dissolved oxygen and the reducing agent, a reactor outlet dissolved oxygen measuring unit 80 connected with an output of the activated carbon fiber reactor 70 for measuring the dissolved oxygen in water, an ion exchange resin tank 90 connected with the activated carbon fiber catalyst reactor 70 for removing impurity ions in water, a filtering apparatus 100 connected with the ion exchange resin tank 70 for removing impurity components in water, and a water quality monitoring unit 110 for automatically recording the measured values of the dissolved oxygen measuring units 60 and 80 and the water flow rate controller 50, controlling the reducing agent injection pump 40 and automatically controlling the amount of reducing agents supplied with water.

A water tank valve 11 and a water pump discharge valve 21 are connected with the water tank 10 and the water pump 20 for controlling the flow of the water.

A reducing agent tank valve and a reducing agent pump discharge valve 41 are provided in the reducing agent injection pump 40 connected with the reducing agent tank 30.

The reactor 70 is configured so that the activated carbon fiber catalyst or metal supported activated carbon fiber catalyst are packed.

A water flow rate sensor 51 and a water flow rate control valve 52 are connected with the water flow rate controller 50, and the water flow rate controller 50 automatically controls the opening/closing states of the water flow rate control valve 52 so that the amount of water is uniformly Maintained in accordance with a signal from the water flow rate sensor 51.

As the dissolved oxygen measuring apparatuses 60 and 80, a dissolved oxygen measuring unit (Model-3600) by Orbisphere Co. Ltd. having an accuracy level of below 1% is used.

The water quality monitoring unit 110 automatically stores the data of dissolved oxygen concentration measured by the dissolved oxygen measuring apparatuses 60 and 80 and the water flow rate measured by the water flow rate controller 50 by time based on a personal computer mounted in the system and controls the feeding rate of the reducing agent in accordance with the water flow rate and the reactor entrance dissolved oxygen.

One or combined ones selected from the group comprising hydrogen, hydrazine, DEHA, carbohydrazide MEKO, ascorbic acid, erythorbic acid is injected into the reducing agent tank 30.

The operation of the dissolved oxygen removing apparatus based on the activated carbon fiber according to the present invention will be explained.

The water stored in the water tank 10 is pumped using the water pump 20. A reducing agent transferred from the reducing agent tank 30 and the injection pump 40 is supplied with the pumped water. The water supplied with the reducing agent flows into the reactor 70 by controlling the water flow rate by the flow rate controller 50. At this time, The dissolved oxygen in the water is measured using the reactor entrance dissolved oxygen measuring unit 60 at the entrance of the reactor before the water is supplied to the reactor 70 and then flows into the reactor 70. The dissolved oxygen contained in the water and the reducing agent make a catalytic reaction therebetween in the activated carbon fiber catalyst reactor 70 for thereby removing the dissolved oxygen in the water. The water from which the dissolved oxygen is removed in the reactor 70 is discharged to the outside of the reactor 70, and then the dissolved oxygen contained in the treated water is measured by the reactor outlet dissolved oxygen measuring unit 80. The water is transferred to the ion exchange resin tank 90, and excessive reducing agent and impurity ions in the water are removed. The water discharged from the ion exchange resin tank 90 is filtered by the filtering apparatus 100 for thereby removing impurity components contained in the water and then is used as deoxygenated water.

In addition, the values measured by the dissolved oxygen measuring units 60 and 80 at the inlet and outlet of the reactor and the water flow rate measured by the water flow rate controller 50 are recorded into the water quality monitoring unit by time, and the injection amount of the reducing agent is automatically controlled by controlling the reducing agent injection pump 40 using the water quality monitoring unit 110 in accordance with the measured values of the reactor entrance dissolved oxygen measuring unit 60 and the water flow rate.

In the present invention, as a reducing agent, a diluted liquid of 2% of hydrazine is used. This reducing agent is supplied with the water in the reactor by 20 ppm with respect to the total amount of the water. The experiment was conducted under the following test conditions.

Water quality: pH 7.1, Cond 132 μs/cm, calcium ion 15.56 ppm, Magnesium ion 3.15 ppm, Natrium ion 7.02 ppm, Kalium ion 1.32 ppm, Silica 3.51 ppm, Iron ion 0.04 ppm, Sulphate ion 19.38 ppm, Chloride ion 11.89 ppm, Nitrate ion 5.05 ppm Temperature of water: 12.2° C.
Amount of liquid: 72, 120, 168, 192 BV/hr
Catalysts: Activated carbon fiber catalyst, metal supported activated carbon fiber catalyst The table 3 illustrates the physical characteristic of the dissolved oxygen removal reaction catalyst

TABLE 3

Physical Characteristics of the Dissolved Oxygen Removal Reaction Catalysts

| Catalysts | BET surface ($m^2$/g) | Pore volume (cc/g) | Catalyst size (mm) | Remarks |
|---|---|---|---|---|
| Activated carbon fiber catalyst | 945 | 0.347 | φ67xL235 | Cartridge type |
| Metal supported activated carbon fiber catalyst | 945 | 0.347 | φ10xT6 | Felt type Supported metal percentage: 1 wt % |

The experimental results conducted on the above-described conditions are as follows.

EXAMPLE 1

The dissolved oxygen was hardly removed based on only the hydrazine process at a room temperature. Namely, the dissolved oxygen was remained 9.4 ppm. However, the amount of the dissolved oxygen was greatly decreased by passing the same through the activated carbon fiber catalyst reactor.

Figure 2:
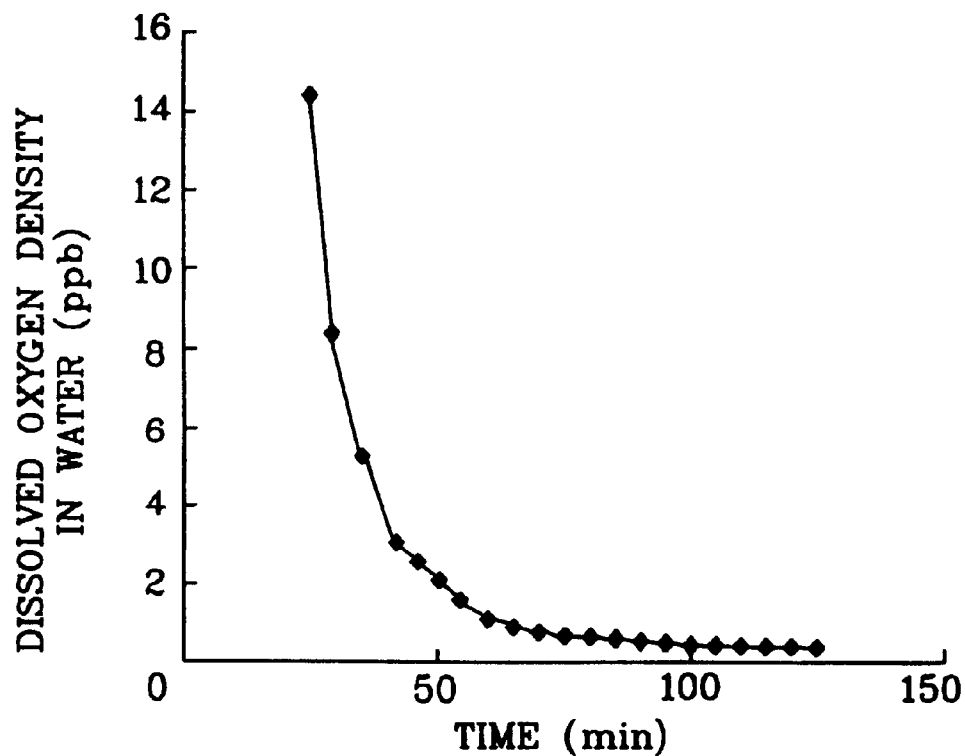
FIG. 2 is a graph illustrating dissolved oxygen concentration variation of a processing water passed through an activated carbon fiber catalyst according to the present invention.
Figure 3:
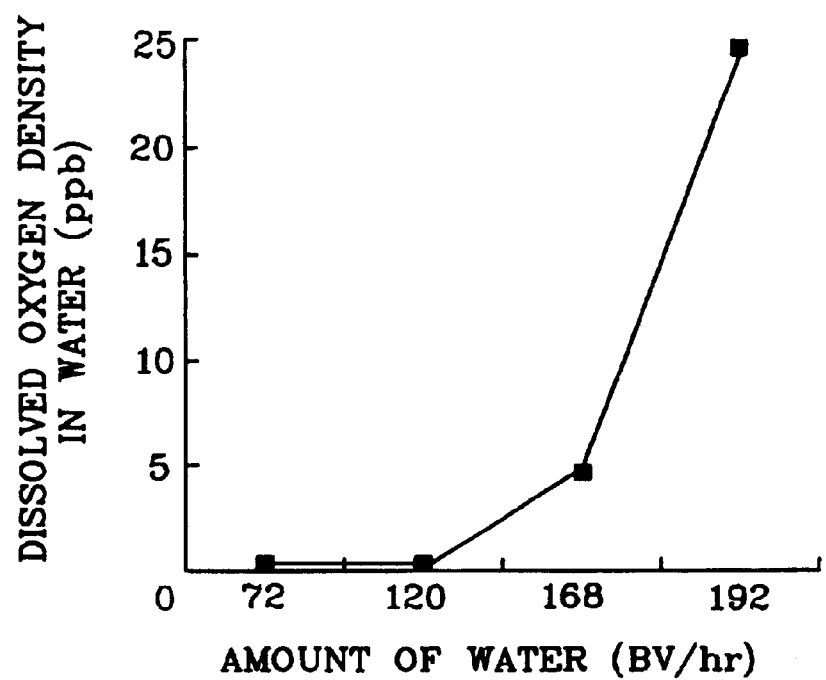
FIG. 3 is a graph illustrating dissolved oxygen concentration variation of a processing water by water flow rate when passing through a activated fiber catalyst according to the present invention.

The table 4 illustrates the measured results of the concentration of the dissolved oxygen contained in the water and passed through the activated carbon fiber reactor under the conditions of a dissolved oxygen concentration of 9.4 ppm, a water temperature of 12.2° C., and $N_2H_4$ of 20 ppm which were obtained by measuring at the entrance of the reactor. FIG. 2 illustrates the contents of the table 4.

TABLE 4

The measured values of the concentration of the dissolved oxygen contained in the water and passed through the activated carbon fiber reactor based under the conditions of a dissolved oxygen concentration of 9.4 ppm, a water temperature of 12.2° C., and $N_2H_4$ of 20 ppm which were obtained by measuring at the entrance of the reactor.

| Reaction Time (min) | 25 | 30 | 35 | 40 | 45 | 50 | 55 | 60 | 65 | 70 | 75 |
|---|---|---|---|---|---|---|---|---|---|---|---|
| Dissolved oxygen in water (ppb) | 14.34 | 8.46 | 5.48 | 2.9 | 2.36 | 1.83 | 1.5 | 0.92 | 0.84 | 0.73 | 0.64 |
| Reaction Time (min) | 80 | 85 | 90 | 95 | 100 | 105 | 110 | 115 | 120 | 125 | |
| Dissolved oxygen in water (ppb) | 0.57 | 0.5 | 0.49 | 0.49 | 0.48 | 0.43 | 0.42 | 0.43 | 0.42 | 0.42 | |

The table 5 illustrates the measured values of the concentration of the dissolved oxygen contained in water and passed through the activated carbon fiber catalyst reactor based on the space velocity variation under the conditions of a dissolved oxygen concentration of 9.4 ppm, a temperature of 12.2° C., and $N_2H_4$ of 20 ppm which were measured at the entrance of the reactor.

TABLE 5

The measured values of the dissolved oxygen contained in the water and passed through the activated carbon fiber reactor based on the space velocity variation conditions of a dissolved oxygen concentration of 9.4 ppm, a water temperature of 12.2° C., and $N_2H_4$ of 20 ppm which were obtained by measuring at the entrance of the reactor.

| Space velocity (Bv/hr) | 72 | 120 | 168 | 192 |
|---|---|---|---|---|
| Dissolved oxygen in water (ppb) | 0.42 | 0.38 | 4.55 | 25 |

As shown therein, the concentration of the dissolved oxygen contained in water was maintained below 1.0 ppb after 60 minutes under the conditions of a reaction temperature of 12.2° C. and a space velocity of 120 BV/hr. When increasing the space velocity to 192 Bv/hr, the processing performance is decreased.

Therefore, the space velocity is maintained below 120 BV/hr, and the water process is performed after 60 minutes of an initial operation.

EXAMPLE 2

The following table 6 illustrates an experimental result based on the concentration variation of the dissolved oxygen contained in water and passed through the activated carbon fiber catalyst reactor using a catalyst such as Hydrogen, Diethylhydroxylamine (DEHA), Carbohydrazide, Methyl-ethyl-ketoxime (MEKO), Ascorbic acid, Erythorbic acid. As shown therein, when the water passes through the catalyst reactor, the dissolved oxygen concentration is significantly decreased.

TABLE 6

Experimental results for the concentration variations of the dissolved oxygen contained in water and passed through the activated carbon fiber catalyst reactor using Hydrogen, Diethylhydroxylamine (DEHA), Carbohydrazide, Methyl-ethyl-ketoxime (MEKO), Ascorbic acid, and Erythorbic acid as a reducing agent.

| Reducing agents | Test condition | | | Dissolved oxygen before reaction (ppm) | Dissolved oxygen after reaction (ppm) |
|---|---|---|---|---|---|
| | Injection level (ppm) | Space velocity (EV/hr) | Temp (° C.) | | |
| Diethylhydroxyl-amine (DEHA) | 20 | 120 | 12.2 | 9.4 | 4.3 |
| Hydrazine | 20 | 120 | 12.2 | 9.4 | 0.38 |
| Hydrogen | 10 | 120 | 12.0 | 9.2 | 6.7 |
| Carbohydrazide | 20 | 120 | 12.5 | 9.4 | 3.8 |
| Methyl-ethyl-ketoxime | 20 | 120 | 12.1 | 9.1 | 4.5 |
| Ascorbic acid | 20 | 120 | 12.2 | 9.4 | 4.8 |
| Erythorbic acid | 20 | 120 | 12.2 | 9.4 | 4.7 |

EXAMPLE 3

As a metal supported on the activated carbon fiber, one selected from the group comprising Pt, Pd, Au, Ag, Ni, W, Co, Mn, Fe, Cu, Rh, and Ir is selected.

The following table 7 illustrates a fact that the dissolved oxygen removing performance was significantly increased when various metals were supported on the activated carbon fiber. When a metal was supported, the conversion rate was increased up to 6.72% (when Pt was carried). In the present invention, since the conversion rate was greatly increased, the excellent performance was obtained in the present invention. In the present invention, a metal was supported by the impregnation method so that the metal supported amount become approximately 1 wt. % with respect to the activated carbon fiber supporter. A calcination of a metal supported catalyst was performed under the environment of nitrogen gas at a temperature of 400° C. The catalytic reaction test for removing the dissolved oxygen was conducted based on the following conditions and the performances of the catalysts were compared in the differential reactor using a small amount (about 0.07 g) of catalyst.

Reaction temperature: 20° C.
Amount of water: 1.0 L/min
Amount of catalyst: 3 layers (diameter of 10 mm)
concentration of reaction material: $N_2H_4$ 28 ppm, DO 8.5 ppm

TABLE 7

Dissolved oxygen removal performance comparison when various metals are carried into activated carbon fiber

| Classification | Conversion rate (%) | Activity rank of catalyst |
|---|---|---|
| ACF | 1.45 | 13 |
| Ni (1 wt %)/ACF | 5.78 | 4 |
| Co (1 wt %)/ACF | 5.91 | 2 |
| Mn (1 wt %)/ACF | 4.85 | 7 |
| Pt (1 wt %)/ACF | 6.72 | 1 |
| Pd (1 wt %)/ACF | 2.28 | 11 |
| Fe (1 wt %)/ACF | 1.97 | 12 |
| Au (1 wt %)/ACF | 3.12 | 10 |
| Ag (1 wt %)/ACF | 5.21 | 6 |
| Cu (1 wt %)/ACF | 5.83 | 3 |
| Rh (1 wt %)/ACF | 4.28 | 8 |
| Ir (1 wt %)/ACF | 3.16 | 9 |
| W (1 wt %)/ACF | 5.40 | 5 |

As a result of the experiment according to the present invention, it is known that the dissolved oxygen removing performance based on the activated carbon fiber catalyst or metal supported activated carbon fiber catalyst is excellent even at a room temperature. When applying the apparatus according to the present invention to a steam generator and a cooling water system, it is possible to prevent the corrosion problem due to dissolved oxygen in a water circulating system and to extend the life time of the system. In addition, the operational cost decreasing effect is maximized.

In the present invention, it is possible to fully remove the dissolved oxygen contained in water at a room temperature below 2 ppb by parallely processing an activated carbon fiber catalyst or a metal supported activated carbon fiber catalyst which has a high surface area and a strong dissolved oxygen adsorption force, so that the apparatus and method according to the present invention may be applicable to a dissolved oxygen removing apparatus used in a steam generator, a cooling system, etc. In addition, the apparatus according to the present invention is capable of extending the lift time of the system and decreasing the maintenance cost.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:
1. A method for removing dissolved oxygen in water used for a steam generator and a cooling water system using an activated carbon fiber catalyst and a reducing agent, comprising the steps of:
   (a) injecting the reducing agent into the water;
   (b) measuring a concentration of dissolved oxygen contained in said water of step (a) containing reducing agent;
   (c) controlling a supplied amount of the water;
   (d) removing dissolved oxygen contained in the water by reaction between the reducing agent and the dissolved oxygen in an activated carbon fiber reactor in which an activated carbon fiber catalyst is packed; and
   (e) controlling an amount of the reducing agent injected into the water in step (a) in accordance with the supplied amount of water and the concentration of dissolved oxygen measured in step (b).

2. The method of claim 1, wherein in step (a) said reducing agent is selected from the group consisting of hydrogen, hydrazine, diethylhydroxylamine, ascorbic acid, erythorbic acid, carbohydrazide, methyl-ethyl-ketoxime, and mixtures thereof.

3. The method of claim 2, wherein said reducing agent is hydrazine.

4. The method of claim 1, wherein the catalyst in step (d) is selected from the group consisting of an activated carbon fiber and activated carbon fiber having metal supported thereon.

5. The method of claim 4, wherein said metal supported on the activated carbon fiber is selected from the group consisting of Au, Ag, Ni, W, Co, Fe, Cu, Rh, Ir, and mixtures thereof.

6. The method of claim 1, wherein said activated carbon fiber catalyst consists of activated carbon fibers.

7. An apparatus for removing dissolved oxygen in water used for a steam generator and a cooling water system using an activated carbon fiber catalyst, comprising:

a water tank for storing water therein;

a water pump connected with the water tank, for pumping water;

a reducing agent injection unit for injecting a reducing agent into water from the water tank;

a water flow rate controller from controlling the water flow rate;

a reactor inlet dissolved oxygen measuring unit connected with the water flow rate controller, for measuring dissolved oxygen;

an activated carbon fiber catalyst reactor connected with the water pump, in which reactor an activated carbon fiber catalyst is packed, for performing a catalytic reaction between the dissolved oxygen and the catalyst reaction;

a water quality monitoring unit for automatically recording the measured values of the dissolved oxygen measuring unit at an inlet and an outlet of the activated carbon fiber catalyst reactor and controlling the injection amount of the reducing agent injected into the water in accordance with the measured values of the reactor inlet dissolved oxygen measuring un it and the water flow rate.

8. The apparatus of claim 7, wherein said reducing agent injection unit injects a reducing agent selected from the group consisting of hydrogen, hydrazine diethylhydroxylamine, ascorbic acid, erythorbic acid, carbohydrazide, methyl-ethyl-ketoxime, and mixtures thereof.

9. The apparatus of claim 7, wherein said activated carbon fiber catalyst reactor uses a catalyst that is selected from the group consisting of an activated carbon fiber and activated carbon fiber having a metal thereon.

10. The apparatus of claim 9, wherein a metal supported on the activated carbon fiber is selected from the group consisting of Pt, Pd, Au, Ag, Ni, W, Co, Mn, Fe, Cu, Rh, Ir, and mixtures thereof.

* * * * *